Patented Sept. 4, 1951

2,566,424

UNITED STATES PATENT OFFICE 2,566,424

POWDERED GLASSY PHOSPHATE COMPOSITION AND METHOD OF MAKING THE SAME

Casimir J. Munter, Upper St. Clair Township, Allegheny County, Pa., assignor to Hall Laboratories, Inc., a corporation of Pennsylvania No Drawing. Application February 28, 1946,
Serial No. 651,017

13 Claims. (Cl. 252—175)

The present invention relates to a powdered glassy phosphate composition and method of making the same.

Phosphate glasses have come into wide use for water conditioning and particularly for water softening, as disclosed for example in the Hall Reissue 19,719. Phosphate glasses, as distinguished from crystalline phosphates, are quite deliquescent and difficult to dissolve. They tend to take up moisture from the air forming a sticky coating on the surfaces of the phosphate particles, causing them to adhere in a compact cake. When the glassy phosphates are put into water to dissolve them, the same sticky adherent layer is formed on the surfaces of the phosphate glass, rendering solution slow in the case of the larger particles and tending to make a powdered glass cohere into a sticky mucilaginous mass which is difficult to dissolve. In fact, it is more difficult to dissolve the powdered material than it is to dissolve the phosphate glass in fair-sized pieces.

These water conditioning phosphates are made by melting an alkali-metal phosphate composition, usually a sodium phosphate composition having the desired ratio of sodium oxide to phosphorus pentoxide, and then rapidly chilling the mass to form a glass, usually by pouring on a cold plate or passing between chilled rolls. The glass plates may be broken into coarse pieces, usually about ⅛ to ¼ of an inch thick and of an average area of about 2 square inches, in which form they may be used for many commercial purposes, such as water softening in boiler plants, etc.

The glass may be ground to a fine powder which has utility for certain purposes where the glass can be mixed with a dispersing agent, such as with soap or dispersed into cheese as a cheese-melting salt. Attempts to use the powdered glass for domestic water softening purposes have, however, resulted in failure because of the virtual impossibility of rapidly dissolving the glass. As stated above, when an attempt is made to mix a powdered phosphate glass with water the particles immediately stick together to form a tacky mass which is very difficult to dissolve even when stirring.

While there has been an insistent demand for a readily soluble phosphate glass water softening powder, so far as I am aware, no such powder has appeared on the market.

Attempts have been made to produce water softening phosphate glass in forms which can be dissolved in water for domestic or industrial water softening purposes, but such attempts have not been entirely satisfactory.

These attempts have been by mechanical treatment of the phosphate glass by putting it either into the form of flakes or agglomerates. The expedient of putting the phosphate glass into the form of flakes is disclosed in the Zinn Patent 1,979,926, the product of which has gone into extensive commercial use. As disclosed in the Zinn patent, the phosphate glass is passed between rapidly rotating rolls which roll the molten glass into a very thin sheet of the order of one-thousandth to one-hundredth of an inch in thickness, which is broken up into flakes. These flakes may or may not be adjusted by the addition thereto of alkali-metal salts, such as trisodium orthophosphate and sodium carbonate. The flakes, because of their substantial thickness and area, require time for dissolving. When a handful of flakes is dropped in a basin of water it will fall to the bottom of the basin and tend to form a sticky mass, which must be stirred into the water to dissolve it. When an attempt is made to stir by means of the hand, such as in the wash basin or bath tub, the sharp flaky particles may lacerate the skin. This is a common cause of complaint from domestic users of flakes. The flakes have the surface deliquescent properties of the original glass and require shipment and shelf storage in moisture-proof containers. Moreover, the process of making the flakes is expensive and difficult to control.

Another attempt at mechanical treatment to produce a more readily soluble form of phosphate glass is disclosed in the Hubbard & McCullough Patent 2,244,158. According to this patent the phosphate glass is powdered and the surfaces of the powdered particles are coated with sticky films either by exposing them to water vapor or coating the particles with a sticky material. The sticky particles are then agglomerated, either with or without the addition of alkaline or acid adjusting salts, to form distinct granules containing a large number of particles per granule. These granules are stated in the patent to disintegrate into individual particles and dissolve when dropped into a sufficient depth of water. However, when a handful of the granules is thrown into a basin of water or is placed in the bottom of a container and the water poured on to it, which are the usual ways of adding a water softening compound to water, the granules form upon the bottom of the basin or container a sticky mass which is difficult to dissolve even with stirring. Even when the granules are sprinkled into water, as described in the Hubbard & McCullough patent, an appreciable time for dissolving is required because the water must first penetrate the granules and dissolve the bonds between the particles before the particles are released to be individually dissolved in the water. After these bonds are separated there is still a tendency for the individual particles to stick together and form a difficulty soluble tacky mass, particularly where a quantity of the material is dumped into the water or initially placed upon the bottom of the container. The granules, like the original phosphate powder from which they are made, tend to absorb moisture from the atmosphere and require storage in moisture-proof packages.

I have produced a powdered phosphate glass composition which is more rapidly soluble than phosphate compositions heretofore produced. As distinguished from the mechanical attempts, such as by flaking or agglomerating, I produce more rapid solubility by chemical means. As hereinafter more specifically described, I treat the individual particles of the phosphate glass so as to form thereon a surface coating which may be either an acid substance or a substance which reacts with acid to release a gas, and mix with the acid-coated particles a powdered material which reacts with the acid to release a gas or mix with the gas-releasing-substance-coated particles an acid substance which reacts with it to produce a gas. I may coat the particles with an acid by moistening the particles of glassy phosphate and mixing with them a powdered acid such as citric acid to coat the particles and then dry the particles at a temperature below that at which significant reversion of the glassy phosphate to an acidic reversion product occurs, and then mix with the dried powder a substance which reacts with the acid to release a gas, such for example as finely powdered sodium bicarbonate. Or I may similarly moisten the particles, coat them with sodium bicarbonate and dry the particles, and then mix the dried powder with a powdered acid such as citric acid which will react in water solution with the bicarbonate to release a gas. As an alternative, I may divide the original powdered phosphate glass into two parts and coat the particles of one part with an acid, then coat the other particles with a gas-releasing substance, and then mix the two parts. In this case the particles of powdered glass which are coated with the gas-releasing substance serve as a powdered constituent to react with the acid-coated particles, and vice versa, and such procedure is intended to be covered within the scope of my broader claims.

In any event, the particles of the powdered phosphate glass are coated with one of the substances which reacts to produce a gas so that when the processed phosphate glass powder is added to water the individual particles are encased or have attached to them individual films or bubbles of released gas which prevent the particles from adhering or clumping together and tend to disperse the individual particles and suspend them in the water so that rapid solution is attained even without stirring when the phosphate is added to water in the usual ways.

In the preferred procedures, which are specifically described and claimed in this application, the phosphate particles which are coated are moistened and dried at low enough temperatures to prevent the formation of any significant amount of acid reversion product of the phosphate glass. Reliance is placed upon the acid which is either coated upon the particles or mixed with the particles coated with the gas-releasing substance to furnish the acid for releasing the gas, and the effectiveness of the phosphate glass in softening water is in no way reduced by partial conversion to an acidic reversion product. Phosphate glasses are formed by heating acid phosphate salts to drive off water of constitution. Such glasses upon heating in the presence of water take up water of constitution and form acid phosphates which may be crystalline or glassy, and which I refer to as acidic reversion products.

I will now specifically describe my method when the particles are coated with the gas-releasing substance.

The glassy phosphate which I prefer to use is a sodium phosphate glass containing approximately 67% $P_2O_5$ and having a ratio of $Na_2O$ to $P_2O_5$ of about 1.12 to 1. This glass is made in the usual way by forming a melt and quickly chilling the melt to form the glass. The glass is then crushed and ground to form a powder, preferably to pass a 60 mesh per inch screen or finer. This powdered phosphate glass is then mixed with approximately 2½ parts by weight of sodium bicarbonate and 2½ parts by weight of sodium carbonate, both ground to pass a 100 mesh screen, to 100 parts by weight of the powdered glass. The mixture is then subjected to a current of warm humidified air, preferably in a rotating drum having louvres through which the humidified air passes and uniformly moistens the mass until the mass is in a moist crumbly condition. The phosphate glass is naturally somewhat deliquescent and the surfaces are hydrated to a sticky condition in which the powdered bicarbonate and carbonate adhere to the surfaces and the particles become attached to or coat the surfaces of the glass particles. Since the surfaces of the particles are moist, some of the carbonate or bicarbonate goes into solution in the water of hydration at the surfaces of the particles. The air is warmed to a temperature preferably not over about 35 to 40° C. and is humidified with steam to approximately 90% relative humidity at that temperature. The rate of feed, the rotation of the drum and the current of humidified air are adjusted so that the powder picks up about 4% of its weight of moisture. This moisture humidifies or hydrates the surfaces of the particles of phosphate glass but at a temperature sufficiently low so that there is no significant reversion of the surfaces of the phosphate glass particles to an acid reversion product.

The powder, having the surfaces of its particles thus hydrated and coated with the carbonate and bicarbonate, is passed through a drier, preferably a drum having louvres through which drying air substantially free from moisture is passed. The temperature of the air should not be over about 50° C. and the powder itself should not be heated above a maximum of 50° C., preferably somewhat below this. The length of the drying drum, the feed of material and the current of air are adjusted so that the powder is dry as it is discharged. The temperature of the moist air, as well as the drying air, is maintained low enough so that there is no significant reversion of the glass to an acidic reversion product which would take place if the temperatures were higher. It is preferable that there be no significant acidic reversion product, particularly in the case where the particles are coated with the carbonate or bicarbonate, because such reversion product, being in solution in the water of hydration at the surfaces, would react with and break down the carbonate or bicarbonate. Also the acidic reversion product has less calcium-sequestering powder than the glass itself and where, as in the process described in this application, the acid is furnished as an added constituent, it is desired that the calcium-repressing powers of the glass be not weakened by the formation of reversion product.

The product as discharged from the drier is screened to remove any material over 80 mesh. The screened product is then mixed with some acidic substance, such as a solid acid or acid salt, such for example as citric acid or sodium acid pyrophosphate. The product is then ready for packaging. The coarser material which is screened out is put into the grinder along with the raw phosphate glass and reprocessed.

When the product is put into water to dissolve it, reaction takes place between the added acidic substance and the carbonate and bicarbonate coated surfaces of the particles, generating films or bubbles of gas which encase the particles. Such gas keeps the particles from sticking or clumping together. It tends to not only disperse or drive the particles apart but also to suspend the particles in the water and thus speed their solution.

The alternative process in which the particles are coated with an acidic substance rather than with the alkaline gas-releasing substance may be carried out as follows. Sodium phosphate glass is prepared by melting, quick cooling, crushing and grinding, as above described. A finely powdered acidic substance such as citric acid or sodium acid pyrophosphate is then mixed with the glass. The acidic substance is powdered to 100 mesh or finer. About 3 parts of citric acid are added to 100 parts of the powdered glass, or about 5 parts of the sodium acid pyrophosphate is added to 100 parts of the powdered glass. The mixture is then put through a drum, where it is subjected to a moist atmosphere to hydrate the surfaces of the particles and cause the adherence of the powdered acidic substances as above described. The mixture is then dried as above described and screened, preferably to remove particles above about 8 mesh. The screened product is mixed with a substance which reacts with the acidic coatings to release the gas, preferably about 2½ parts of sodium carbonate and 2½ parts of sodium bicarbonate by weight. The mixture is then ready for packaging. In this case when the mixture is added to water, the sodium bicarbonate or carbonate reacts with the acidic coating to produce gas films or bubbles on the individual particles of the phosphate glass.

A third specific method may be employed which follows the same general principles and gives similar effects to those above described. The powdered phosphate glass is divided into two approximate equal parts. One part is coated with an acidic substance, as above described, and the other part is coated with a gas-releasing substance, as above disclosed. The powders thus coated are dried as above disclosed and are then thoroughly mixed. The acidic and gas-releasing substances with which the particles are coated react when the mixture is put into water and the particles are encased with gas films which tend to disperse and suspend them.

Various acidic substances may be employed. In addition to citric acid and acid sodium pyrophosphate above mentioned, other solid organic acids may be used, such as salicylic acid, oxalic acid, citric acid, maleic acid, tartaric acid, etc., and other acid salts may be used, such as monosodium dihydrogen orthophosphate, sodium acid sulphate, potassium acid tartrate, etc. The acidic substances are employed in effective amounts, that is, in amounts sufficient to react with the gas-releasing substance to release enough gas to produce a rapidly soluble phosphate glass powder. At least ½% of an acid should be used and at least 1 to 2% of an acid salt is required. In general the greater amount of acid or acid salts within limits the more rapidly soluble is the powder. However, if too much acidic substance is added, the powder is diluted and therefore not more than about 10% should be used.

While I prefer to use sodium carbonate and sodium bicarbonate, either alone or together, as the gas-releasing substances, particularly where the powder is for domestic use, other substances may be used which will release gas upon reaction with the acidic substance employed. For example, sodium bisulphite or sodium sulphite may be employed, releasing in this case sulphur dioxide gas. Where the material to be put in solution is employed for boiler water conditioning, such gas-producing substances may be advantageously used where it is desired to add sodium bisulphite or sodium sulphite to the boiler water.

The amount of gas-producing material may be varied from the stoichiometrical amount required to react with the acidic material. Where it is desired that the powder have an alkaline reaction, enough of the gas-producing substance, such as sodium carbonate and sodium bicarbonate, may be added to give the desired pH value to the water in which the powder is dissolved. On the other hand, if it is desired that the powder have an acid reaction, the acidic substance may predominate. An effective amount of the gas-releasing substance must be employed to react with the acid and produce sufficient gas to insure rapid solubility of the phosphate glass powder. The gas-releasing substance should be used in amount of at least about 1% and should not be used in an amount more than about 10% because of its diluent effect.

Other materials may also be added to adjust the acidity or alkalinity of the powder. For example, trisodium orthophosphate or sodium metasilicate may be mixed with the powder for alkalinity, or potassium acid phthalate or sodium acid fluoride may be added for acidity.

While it is preferred to moisten the powdered glass by passing humidified air through a mass of the powdered glass so as to get uniform hydration throughout the mass and produce sticky surfaces so that all of the particles will pick up a coating of the acidic or gas-releasing substance, other methods of moistening may be employed. For example, the acidic or gas-releasing substance with which the particles are to be coated may be dissolved in any suitable solvent and the glass wet with the solution and then dried to drive off the solvent and leave the coating on the surfaces of the glass particles. Solvents which can be used are water, ethyl or methyl alcohol, acetone, or mixtures which are capable of dissolving the added agent. The solvent is preferably one which has some solvent effect upon the surfaces of the glass to insure the adherence of the added substance to the glass and also, as hereinafter described, to control the bulking, free-flowing and moisture-resistant properties of the processed glass. Still other methods are the mixing of the glass and powdered substance to be coated with some hydrated salt which will yield moisture upon mixing, such for example as sodium sulphate decahydrate, sodium carbonate decahydrate, and disodium orthophosphate dodecahydrate.

The coating of the glass particles with the added substance as above described has a twofold effect. It insures gas release at the surfaces of the individual particles so as to get dispersion and suspension with consequent rapid solution when the processed powder is added to water. The hydration of the surface of the particles, the addition to and partial solution in the hydrated surfaces of the added acid or gas-releasing substance, and the subsequent drying forms a coating consisting at least in part of a solid solution in the glass of the added acid or gas-releasing substance and changes the surface characteristics of the particles and produces a powder in which not only the bulking may be increased and regulated but also a powder having better free-flowing properties and better resistance to moisture than the original glass. When I speak of a solid solution in the glass of the added acid or gas-releasing substance, I use the words "solid solution" as a term of general description and not of limitation and intend to include the presence of the added substances in solid form in the surfaces of the glass particle, whether in glassy or crystalline state.

While the amount of water or the solvent may be limited to the amount just required to stick the added coated substance to the glass particles, it is preferred, particularly in the case of water, to use an excess so that the surfaces of the particles will be hydrated. Such hydration of the surfaces insures some solution of the added coating material into the surface of the glass, insuring better adhesion of the coating substance and also better adhesion of the gas film generated. The bulking characteristics of the powder may be regulated by the amount of excess moisture so that the processed powder may have a greater bulk than the original powdered phosphate glass. By "bulk" I mean the volume occupied by the powder for a given weight. The bulk may be increased by using more water for the surface hydration of the glass particles. It may be varied so that the product will have a bulk but very little greater than that of the original for a minimum of water up to a bulk of two or three times that of the original powder. The original unprocessed powdered glass has a bulk of about 25 cubic inches per pound. The amount of water added during hydration of the particles (and evaporated when the powder is dried) may vary from about 1 to 6%. The addition of about 4% by weight of moisture to the glass about doubles the bulk over that of the original glass. Such bulk of the order of about 50 cubic inches per pound is desirable for many purposes. However, certain advantages may be obtained with a bulk of at least 35 cubic inches per pound up to about 60 cubic inches per pound, and the amount of water is varied to regulate the desired bulk.

I have also discovered that the bulk of the powdered phosphate glass may be increased by hydrating the surfaces of the particles, applying to such surfaces a water-soluble non-hygroscopic salt, and allowing such salt to go at least partially into solution in the hydrated surfaces and then drying.

Non-hygroscopic salts as a class are operative and the invention is not limited to any particular salts, since they may be neutral such as sodium sulphate, alkaline such as trisodium phosphate, or acid such as sodium acid pyrophosphate. For example, a mixture of the powdered glass and the added salt may be moistened to hydrate the surfaces of the glass particles, preferably with water in an amount of from 1 to 6% of the weight of the powdered glass. The water should be so limited that the resultant product is a loose powder. Too much water would cause the powder to agglomerate. The added powdered salt then adheres to the sticky surfaces of the particles and because of its water solubility goes at least partially into water solution in the hydrated surfaces. Upon drying, a surface coating is formed consisting at least in part of a solid solution in the glass of the salt, which alters the surface characteristics of the glass so as to increase the bulk of the powder and its resistance to the absorption of atmospheric moisture. The increase in bulk may be regulated by the amount of water which is added and evaporated, as hereinbefore described. While such a powder does not have the high rate of solution of a mixture containing the gas-releasing substance and an acidic activator therefor, it does have higher bulk than the original glass, as well as better free-flowing qualities and greater resistance to the absorption of atmospheric moisture.

The hydration of the surfaces, the absorption thereon of the coating acidic or gas-releasing substances, and the drying produces other desirable qualities in addition to the control of the bulking. It makes the powder more free-flowing than the original ground glass. The increase in free-flowing characteristics increases in general with the increase in bulk. The hydration, coating and drying of the surfaces also imparts to the powder improved non-caking and moisture-resistant properties, which is of a decided practical advantage for the shelf storage of the processed powder since the processed powder has much less tendency to take up moisture from the atmosphere than the original glass. Moreover, if such powder be subjected to particularly moist conditions, a cake may be formed, which, however, is readily friable and rapidly disintegrates in water even if not broken up.

While, as more specifically described and claimed in this application, the acidic coatings on the glass particles are formed by coating the glass particles with an added acidic substance, the acidic coatings may, within the purview of my broader claims, be otherwise produced, as for example by producing coatings of acid reversion product upon the surfaces of the glass particles, as described and claimed in my copending application Serial No. 651,016, filed of even date herewith, now Patent No. 2,494,828. As described and claimed in said copending application, powdered phosphate glass is first moistened, preferably by passing a moisture-laden current of air through the glass in a rotating louvre drum in order to hydrate or moisten the surfaces of the glass particles and at a temperature below that at which reversion takes place. Thereafter, the surface hydrated particles are subjected to a current of heated air which evaporates the excess moisture and which heats the particles to a point where the remaining moisture reacts with the phosphate glass surfaces to convert the glass into an acidic reaction product, largely sodium acid pyrophosphate.

While I prefer to package and market my processed powder in loose form, the particles of which are for the most part discrete, because I have found that such loose powder has a maximum rate of solution, and also because of its bulking qualities, there may be situations where, for my particular requirements, it will be desirable to put the powder into flakes, cakes or agglomerates. A notable feature of my invention is that, even if the powder is formed into flakes, cakes or agglomerates, it still possesses a more rapid rate of solution than flakes and agglomerates heretofore made. These products may be formed by compressing the powder into the desired shapes.

The glasses which I prefer to employ are those most commonly used for water conditioning purposes. Such glasses usually fall within the range of molar ratios between alkali-metal oxide and phosphorus pentoxide of 1 to 1 and 1.5 to 1. Glasses in this range are readily preparable. Glasses having a molar ratio of alkali-metal oxide to phosphorus pentoxide of more than 1.5 to 1 may be employed, although they are somewhat more difficult to produce because of the tendency of the melt to crystallize on cooling. If the ratio is too high the melt crystallizes upon cooling instead of forming a glass. The practicable maximum ratio appears to be in the neighborhood of 1.7 to 1. It is also possible to use glasses in which the molar ratio of alkali-metal oxide to phosphorus pentoxide is somewhat less than 1. However, as such ratio decreases, the glasses become increasingly acid and increasingly difficult to dissolve. A ratio of alkali-metal oxide to phosphorus pentoxide of about .9 to 1 appears to be about the practicable minimum ratio.

While sodium phosphate glasses are preferred, other alkali-metal phosphate glasses may be employed, such as those of potassium, lithium, rubidium and ammonium, or fused or mechanical mixtures of such glasses, such for example as fused sodium-potassium phosphate glass. For purposes of definition in this case, I include ammonium among the alkali-metals.

The alkali-metal phosphate glasses may contain the usual impurities. For example, most commercial forms of phosphate glass contain a small amount of water of constitution, generally from about ½ to 1%. The glasses may contain other impurities or added substances, such for example as small amounts of boric oxide, silica, calcium oxide, magnesium oxide, etc. Various adjusting agents, either acid or alkaline, may be mixed with the powdered glass to impart the desired pH value to the water in which it is ultimately dissolved.

A wide variety of tests show a remarkable improvement in the rapidity of dissolving over other forms of phosphate glass which have been used or suggested. The housewife usually dumps a quantity of a water softener into the wash basin or wash tub so that the best test should simulate actual conditions. I have developed such a standardized test for comparing various water softening compositions. In this test 10 grams of the material to be tested is dumped from a small beaker held at a height of 1 to 2 inches above the water level into 1 gallon of water in a standard glass specimen jar 9¾ inches in diameter and 6 inches in height. One gallon of water gives a depth of 4 inches in the jar. Material is dumped in one mass by a quick turning of the beaker. The water should be free of currents and should be at 40° C. The material is allowed to dissolve without stirring. The time of dissolving is the time elapsed from the moment of dumping the material into the water until the material has completely dissolved. The following tabulation shows the relative times of dissolving:

| Material | Time of Dissolving |
|---|---|
| | Minutes |
| Powdered sodium phosphate glass of 1.12 to 1 ratio of $Na_2O$ to $P_2O_5$ (to pass 80 mesh) | 56 |
| Sodium phosphate glass flakes of 1.12 to 1 ratio of $Na_2O$ $P_2O_5$ (Zinn Patent No. 1,979,926) | 12 |
| Sodium phosphate glass agglomerates of 1.12 to 1 ratio of $Na_2O$ to $P_2O_5$ (Hubbard and McCullough Patent No. 2,244,158) | 15 |
| Sodium phosphate glass powder of 1.12 to 1 ratio of $Na_2O$ to $P_2O_5$ processed as described immediately below | 1 |

The sodium phosphate glass listed as the glass material in the above table was processed in accordance with my invention by mixing the powdered sodium phosphate glass with 2½% sodium carbonate and 2½% sodium bicarbonate, moistening the mixture with humidified air to add 4% of moisture to the powder, and then drying the powder and mixing with it 3% of citric acid, as more specifically described in the first example set forth previously in this specification. Another lot of sodium phosphate glass which was processed, as set forth in the second specific example recited previously in the specification, by mixing 3% of citric acid with the powdered glass, moistening with humidified air to add 4% of water, and drying, and then mixing the dried material with 2½% sodium carbonate and 2½% sodium bicarbonate, had the same dissolving time, namely 1 minute.

The unprocessed powdered sodium phosphate glass fell to the bottom of the jar and formed a gummy mass which dissolved slowly. The flakes also fell to the bottom of the jar and formed a gummy mass, which, however, dissolved about four times as fast as the plain powdered glass. The agglomerates likewise fell to the bottom of the jar and formed a gummy mass, which dissolved at about the same rate as the flakes. When the powder processed in accordance with my invention was dumped into the water, gas was released as soon as the powder came in contact with the water so that there was an evolution of gas and a dispersal of the particles during the descent of the powder through the water. Some of the powder reached the bottom of the jar but the particles thereof were immediately floated by the generation of gas bubbles and quickly dissolved.

While my processed powder dissolves rapidly in quiet water, the rate of solution may be speeded up by stirring. When stirred it dissolves very much more rapidly than do the flakes or agglomerates. When my processed powder is sprinkled into water, it goes into solution almost instantaneously and the powder particles do not descend more than an inch or so before they are completely dissolved.

The time of dissolving can be varied by varying the amount of acidic and gas-releasing substances present in the processed powder. The time of dissolving can be decreased somewhat below that shown in the above table by increasing the amounts of acid and carbonate and bicarbonate. However, there is no need of getting a faster time of solution and increasing the amounts of acid and carbonate and bicarbonate tends to cut down the calcium-sequestering property of the product. By using less of the acidic and gas-releasing substances, the time of dissolving may be lengthened in the above described test to a matter of a few minutes. However, for a satisfactory product the material should completely dissolve in not more than 4 minutes in the above test.

While I have specifically described the preferred embodiment of my invention, it is to be understood that the invention is not so limited but may be otherwise embodied and practiced within the scope of the following claims.

I claim:

1. A water treating composition consisting essentially of a mixture of the following constituents: (a) a powdered water soluble alkali metal phosphate glass having a molar ratio of alkali metal oxide to phosphorus pentoxide between about 0.9:1 and 1.7:1, (b) a powered solid water soluble acidic chemical compound, and (c) a powdered solid water soluble alkali metal compound which releases a gas when reacted in water solution with said acidic compound, one of the constituents (b) and (c) being in the form of a coating on the particles of the phosphate glass, said mixture being characterized by a high rate of solution in water.

2. A water treating composition consisting essentially of a mixture of the following constituents: (a) a powdered water soluble alkali-metal phosphate glass having a molar ratio of alkali-metal oxide to phosphorus pentoxide between about 0.9:1 and 1.7:1, (b) a powdered solid water soluble acidic chemical compound, and (c) a powdered solid water soluble alkali-metal compound which releases a gas when reacted in water solution with said acidic compound, one of the constituents (b) and (c) being in the form of a coating on the particles of the phosphate glass and the other of said constituents (b) and (c) being in the form of a loose powder, said mixture being characterized by a high rate of solution in water.

3. A water treating composition according to claim 2 in which the constituent (b) is in the form of a coating on the particles of the phosphate glass.

4. A water treating composition according to claim 2 in which the constituent (c) is in the form of a coating on the particles of the phosphate glass.

5. A water treating composition according to claim 1, in which the powdered water soluble alkali-metal phosphate glass has a portion of its particles coated with constituent (b) and another portion of its particles coated with constituent (c).

6. A water treating composition consisting essentially of a mixture of the following constituents: (a) a powdered water soluble sodium phosphate glass having a molar ratio of sodium oxide to phosphorus pentoxide between about 0.9:1 and 1.7:1, (b) powdered citric acid, and (c) powdered carbonate of sodium, one of the constituents (b) and (c) being in the form of a coating on the particles of phosphate glass, said mixture being characterized by a high rate of solution in water.

7. A water treating composition consisting essentially of a mixture of the following constituents: (a) a powdered water soluble sodium phosphate glass having a molar ratio of sodium oxide to phosphorus pentoxide between about 0.9:1 and 1.7:1, (b) powdered citric acid, and (c) powdered carbonate of sodium, one of the constituents (b) and (c) being in the form of a coating on the particles of the phosphate glass and the other of said constituents (b) and (c) being in the form of a loose powder, said mixture being characterized by a high rate of solution in water.

8. A water treating composition according to claim 6, in which the powdered water soluble alkali-metal phosphate glass has a portion of its particles coated with powdered citric acid and another portion of its particles coated with a powdered carbonate of sodium, said mixture being characterized by a high rate of solution in water.

9. The process of treating powdered water soluble alkali-metal phosphate glass having a molar ratio of alkali-metal oxide to phosphorus pentoxide between about 0.9:1 and 1.7:1 to produce a water treating composition having a high rate of solution in water, which comprises hydrating the surfaces of the particles of powder and applying to the hydrated surfaces one of the constituents: (b) a powdered solid water soluble acidic chemical compound, and (c) a powdered solid water soluble alkali-metal compound which releases a gas when reacted in water solution with said acidic compound, drying the hydrated surfaces and thereafter mixing with the glass the other of said constituents (b) and (c).

10. The process of treating powdered water soluble alkali-metal phosphate glass having a molar ratio of alkali-metal oxide to phosphorus pentoxide between about 0.9:1 and 1.7:1 to produce a water treating composition having a high rate of solution in water, which comprises hydrating the surfaces of a portion of the phosphate glass particles and applying to such hydrated surfaces a powdered solid water soluble acidic chemical compound, and drying; separately hydrating the surfaces of another portion of the phosphate glass particles and applying to such hydrated surfaces a powdered solid water soluble alkali-metal compound which releases a gas when reacted in water solution with said acidic compound, and drying; and mixing the two portions of the dry phosphate glass particles thus treated.

11. The process of treating powdered water soluble alkali-metal phosphate glass having a molar ratio of alkali-metal oxide to phosphorus pentoxide between about 0.9:1 and 1.7:1 to produce a water treating composition having a high rate of solution in water, which comprises hydrating the surfaces of the particles of powder with water in an amount from 1 to 6% by weight of the powder and applying to the hydrated surfaces one of the constituents: (b) a powdered solid water soluble acidic chemical compound, and (c) a powdered solid water soluble alkali-metal compound which releases a gas when reacted in water solution with said acidic compound, drying the hydrated surfaces and thereafter mixing with the glass the other of said constituents (b) and (c).

12. The process of treating powdered water soluble alkali-metal phosphate glass having a molar ratio of alkali-metal oxide to phosphorus pentoxide between about 0.9:1 and 1.7:1 to produce a water treating composition having a high rate of solution in water, which comprises hydrating the surfaces of the phosphate glass particles and applying to such surfaces one of the constituents (b) a powdered solid water soluble acidic chemical compound, and (c) a powdered solid water soluble alkali-metal compound which releases a gas when reacted in a water solution with said acidic compound, allowing said applied constituent to go at least partially in solution with the hydrated glass surface and thereafter drying the glass particles at a temperature below that at which significant reversion of the glass takes place so as to form coatings on the glass particles consisting at least in part of the solid solution in the glass of said applied constituent, and thereafter mixing the dried powdered glass with the other of said constituents (b) and (c).

13. The process of treating powdered water soluble alkali-metal phosphate glass having a molar ratio of alkali-metal oxide to phosphorus pentoxide between about 0.9:1 and 1.7:1 to produce a water treating composition having a high rate of solution in water, which comprises hydrating the surfaces of the particles of powder and applying to the hydrated surfaces one of the constituents (b) a powdered solid water soluble acidic chemical compound and (c) a powdered solid water soluble alkali-metal compound which releases a gas when reacted in water solution with said acidic compound, drying the hydrated surfaces, thereafter mixing with the glass the other of said constituents (b) and (c) and regulating the bulk of the processed powder by controlling the amount of hydration of the surfaces of the glass particles.

CASIMIR J. MUNTER.

REFERENCES CITED

The following references are of record in the file of this patent:

UNITED STATES PATENTS

| Number | Name | Date |
| --- | --- | --- |
| Re. 19,719 | Hall | Oct. 8, 1935 |
| 1,037,078 | Strickler | Aug. 27, 1912 |
| 2,008,651 | Zinn | July 16, 1935 |
| 2,211,485 | Zimmerman | Aug. 13, 1940 |
| 2,244,158 | Hubbard et al. | June 3, 1941 |

FOREIGN PATENTS

| Number | Country | Date |
| --- | --- | --- |
| 256,053 | Great Britain | Aug. 5, 1926 |